US010906123B2

(12) United States Patent
Pike et al.

(10) Patent No.: US 10,906,123 B2
(45) Date of Patent: Feb. 2, 2021

(54) QUICK DISCONNECT TORCH HANDLE

(71) Applicant: The ESAB Group Inc., Florence, SC (US)

(72) Inventors: Richard S. Pike, St. Johnsbury, VT (US); Michelle R. Chamberlain, Wentzville, MO (US); Andrew J. Raymond, Lebanon, NH (US)

(73) Assignee: The ESAB Group Inc., Florence, SC (US)

( * ) Notice: Subject to any disclaimer, the term of this patent is extended or adjusted under 35 U.S.C. 154(b) by 483 days.

(21) Appl. No.: 15/808,481

(22) Filed: Nov. 9, 2017

(65) Prior Publication Data
US 2018/0133828 A1    May 17, 2018

Related U.S. Application Data

(60) Provisional application No. 62/420,600, filed on Nov. 11, 2016.

(51) Int. Cl.
*B23K 9/32* (2006.01)
*B23K 9/29* (2006.01)
*H01R 13/00* (2006.01)

(52) U.S. Cl.
CPC .............. *B23K 9/323* (2013.01); *B23K 9/296* (2013.01); *H01R 13/005* (2013.01)

(58) Field of Classification Search
CPC ........ B23K 9/323; B23K 9/296; B23K 10/00; H05H 1/34; H05H 2001/3473
(Continued)

(56) References Cited

U.S. PATENT DOCUMENTS 3,775,584 A * 11/1973 Moerke .................. B23K 9/173
219/137.63
4,049,943 A * 9/1977 Pratt ...................... B23K 9/323
219/74

(Continued)

FOREIGN PATENT DOCUMENTS

CN           1774312 A      5/2006
CN         104185530 A     12/2014
(Continued)

OTHER PUBLICATIONS

Examination Report No. 1 from the Australian Intellectual Property Office for Australian Patent Application No. 2017357030 dated Nov. 18, 2019, 3 pages.
(Continued)

*Primary Examiner* — Benjamin R Shaw
(74) *Attorney, Agent, or Firm* — Edell, Shapiro & Finnan, LLC

(57) ABSTRACT

Provided herein is a quick disconnect torch handle for use in a plasma arc system. In one approach, the plasma arc system includes a lead having a first end connected to a power source and a second end connected to a torch handle. The quick disconnect is located at a proximal end of the torch handle, and may include at least one signal connection, a pilot connection, a fluid connection, and a main power connection. The fluid and power connection may be formed by a connection between a main power socket and a conductive conduit. Specifically, the main power socket includes a conductive spring and an O-ring encircling an interior bore thereof. Removal of the conductive conduit from the main power socket causes the fluid connection to break between the O-ring and the conductive conduit, and then the power connection to break between the conductive spring and the conductive conduit.

18 Claims, 19 Drawing Sheets

(58) Field of Classification Search
USPC .................................... 219/137.63; 439/191
See application file for complete search history.

(56) References Cited

U.S. PATENT DOCUMENTS

| | | | |
|---|---|---|---|
| 4,270,824 A | | 6/1981 | Erickson |
| 4,549,068 A | * | 10/1985 | Kensrue ................. B23K 9/323 219/137.31 |
| 5,338,917 A | * | 8/1994 | Stuart .................... B23K 9/287 219/137.51 |
| 6,683,273 B2 | | 1/2004 | Conway et al. |
| 6,713,711 B2 | | 3/2004 | Conway et al. |
| 6,773,304 B2 | | 8/2004 | Conway et al. |
| 9,040,872 B2 | * | 5/2015 | Anzengruber ........... B23K 9/32 219/137.63 |
| 9,148,943 B2 | * | 9/2015 | Beliveau ............ H01R 13/5205 |
| 9,313,871 B2 | * | 4/2016 | Namburu ................ B23K 10/00 |
| 2003/0089689 A1 | * | 5/2003 | Conway .............. H01R 13/005 219/121.51 |
| 2003/0092318 A1 | * | 5/2003 | Conway ................... H05H 1/34 439/595 |
| 2003/0100208 A1 | * | 5/2003 | Conway ................. B23K 10/00 439/191 |
| 2004/0089639 A1 | * | 5/2004 | Raymond ............... F16L 57/02 219/121.48 |
| 2004/0140295 A1 | * | 7/2004 | Herres ................... B23K 9/323 219/121.5 |
| 2011/0247999 A1 | * | 10/2011 | Ihde ..................... B23K 9/173 219/74 |
| 2014/0131336 A1 | * | 5/2014 | Jacques .................... B23K 9/32 219/137.63 |
| 2015/0114943 A1 | * | 4/2015 | Oberndorfer .......... B23K 9/323 219/137.63 |
| 2018/0117703 A1 | * | 5/2018 | Schmitz ................ B23K 9/167 |

FOREIGN PATENT DOCUMENTS

| | | |
|---|---|---|
| EP | 0074430 A1 | 3/1983 |
| EP | 2255916 A1 | 12/2010 |
| FR | 2601518 A1 | 1/1988 |
| WO | 2004043637 A1 | 5/2004 |
| WO | 2017021849 A1 | 2/2017 |

OTHER PUBLICATIONS

International Preliminary Report on Patentability from PCT/US2017/060895 dated May 14, 2019.
International Search Report and Written Opinion from PCT/US2017/060895 dated Jan. 30, 2018.
Office Action for Canadian Patent Application No. 3,043,009 dated Jun. 1, 2020, 5 pages.
Notification of the First Office Action for Chinese Patent Application No. 201780080895.6 with English translation dated Nov. 4, 2020, 18 pages.

* cited by examiner

QUICK DISCONNECT TORCH HANDLE

CROSS-REFERENCE TO RELATED APPLICATION

This application claims priority to U.S. Provisional Patent Application Ser. No. 62/420,600, filed Nov. 11, 2016, titled "Quick Disconnect Torch Handle", the entirety of which application is incorporated by reference herein.

FIELD OF THE DISCLOSURE

The present disclosure relates generally to fluid and power connectors and, more particularly, to quick disconnects within a handle of a plasma arc apparatus in which both fluid and power are conducted through the quick disconnect.

BACKGROUND OF THE DISCLOSURE

In current plasma arc torches, a torch is commonly connected to a power supply through a torch lead, which is typically available in a variety of lengths according to requirements of a specific application. Generally, the power supply side of the lead is coupled to a housing, commonly in the form of a socket adapted to receive a plug, with a mating set of electrical and fluid conductors disposed therein. Generally, one or more main power pins and mating sockets conduct both electricity and fluid for operation of the torch, through which high current, high voltage, and/or high frequency electrical power is provided to initiate and operate a plasma arc. Further, a plurality of signal pins and mating signal pin sockets conduct electrical signals for operation of the torch, such as a trigger switch or electrical grounding, among others.

The torch lead may be secured to the power supply using a quick disconnect such that the torch lead may be quickly and easily removed from the power supply in the event that the torch and/or torch lead is damaged or requires replacement. Further, the quick disconnect allows a torch and torch lead to be interchanged with a variety of power supplies if necessary. However, current plasma torch handles and lead assemblies are hardwired to one another at the torch end of the lead, and can be upwards of 100 feet or more. These torch and lead assemblies are cumbersome and relatively heavy. As a result, changing out a damaged torch handle assembly, torch head, and/or lead requires disconnection at the power source. Furthermore, having a replacement torch handle with attached lead may not be immediately available in the event of a failure, thus resulting in interrupted work flow and significant downtime.

Additionally, the conductors of known prior art quick disconnects are often prone to damage when the quick disconnect is disengaged since the conductors often extend or protrude beyond the ends of their respective housings. Further, when a conductor is damaged or broken in the field, an improper conductor may inadvertently be used to replace the damaged conductor such that unsuitable equipment, e.g. torches, are mistakenly connected to the power supply. As a result, the torch may function improperly or parts may wear prematurely or the assembly could be hazardous to the user. In addition, the torch can be damaged or operate improperly when disengaging quick disconnects of the known prior art as all of the connections are typically broken simultaneously, or in some instances, the gas continues to flow even when the quick disconnect is not fully engaged. Consequently, the plasma arc torch may become damaged or difficult to operate should an inadvertent disengagement of the quick disconnect occur during operation of the torch.

SUMMARY

In view of the foregoing, what is needed is a torch handle including a quick disconnect assembly contained therein. The torch handle may be removed and replaced at the torch end of the lead with minimal assembly.

A system according to exemplary embodiments of the disclosure may include a lead having a first end connected to a power source, a torch including a handle, wherein the handle is coupled to a second end of the lead, and a quick disconnect assembly at a proximal end of the handle, wherein the quick disconnect assembly comprises at least one signal connection, a pilot connection, a fluid connection, and a main power connection.

A quick disconnect torch handle according to embodiments of the disclosure may include a proximal end and a distal end connected by an interior area, and a quick disconnect assembly disposed within the interior area between the proximal end and the distal end, wherein the quick disconnect assembly comprises at least one signal connection, a pilot connection, a fluid connection, and a main power connection.

A quick disconnect according to embodiments of the disclosure may include a torch handle, and a socket assembly coupled to a conductor assembly within an interior of the torch handle, wherein the conductor assembly includes a conductive conduit, and wherein the socket assembly includes a main power socket having a conductive spring and an O-ring disposed along an interior bore. The quick disconnect may further include a fluid connection formed by the O-ring and the conductive conduit, and a power connection formed by the conductive spring and the conductive conduit.

A plasma arc torch according to embodiments of the disclosure may include a lead having a first end connected to a power source, and a torch including a handle, the handle coupled to a second end of the lead. The plasma arc torch may further include a quick disconnect assembly at a proximal end of the handle, the quick disconnect assembly comprising at least one signal connection, a pilot connection, a fluid connection, and a main power connection.

BRIEF DESCRIPTION OF THE DRAWINGS

The accompanying drawings illustrate exemplary approaches of the disclosed embodiments so far devised for the practical application of the principles thereof, and in which.

Figure 1:
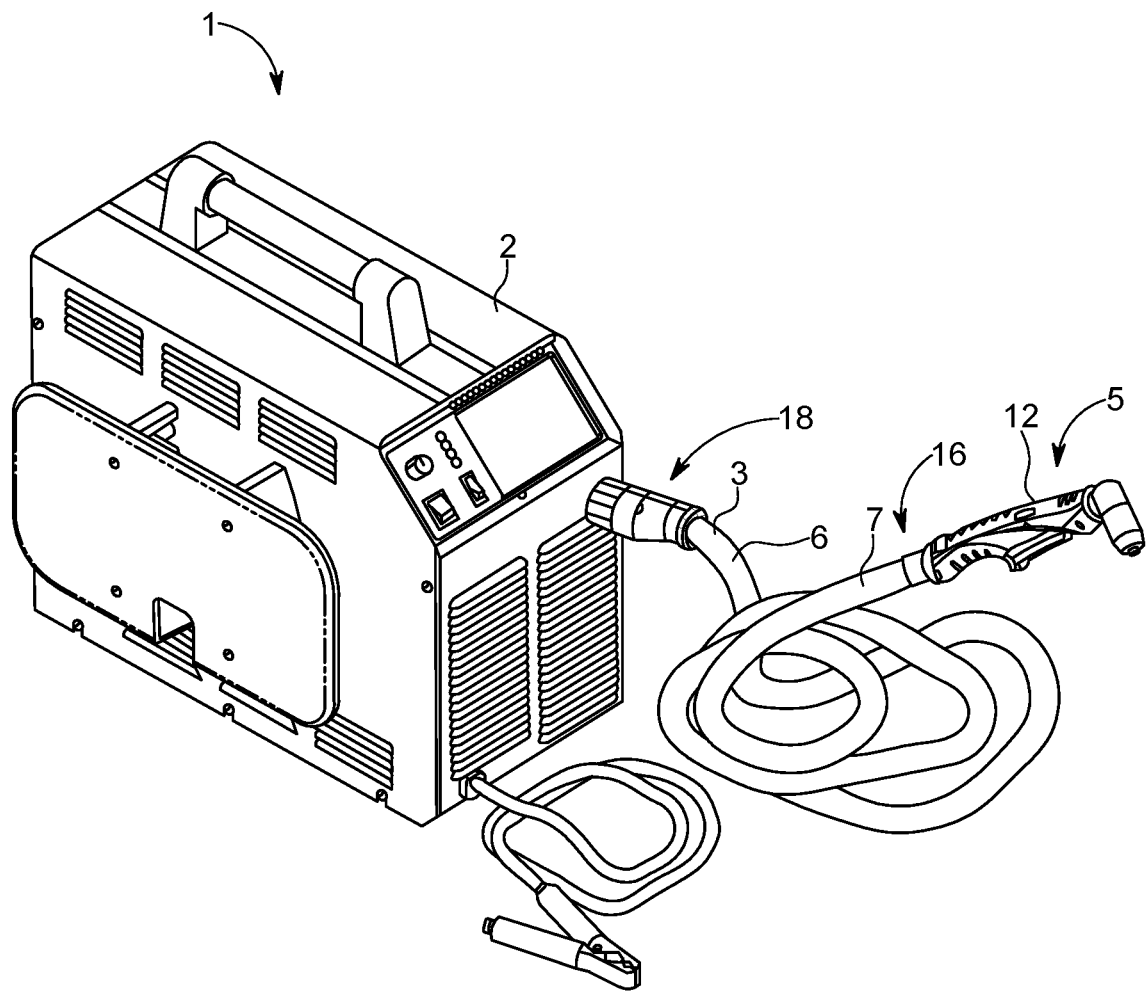
FIG. 1 is an isometric view of a plasma cutting/welding system according to exemplary approaches of the disclosure.

The drawings are not necessarily to scale. The drawings are merely representations, not intended to portray specific parameters of the disclosure. The drawings are intended to depict typical embodiments of the disclosure, and therefore should not be considered as limiting in scope. In the drawings, like numbering represents like elements.

Furthermore, certain elements in some of the figures may be omitted, or illustrated not-to-scale, for illustrative clarity. Furthermore, for clarity, some reference numbers may be omitted in certain drawings.

DETAILED DESCRIPTION

Embodiments in accordance with the present disclosure will now be described more fully hereinafter with reference to the accompanying drawings. The system may be embodied in many different forms and should not be construed as being limited to the embodiments set forth herein. Rather, these embodiments are provided so that this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of various components and their constituent parts. Said terminology will include the words specifically mentioned, derivatives thereof, and words of similar import.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

As stated above, described herein is a quick disconnect torch (QDT) handle for use in a plasma arc system. In one approach, the plasma arc system includes a lead having a first end connected to a power source, and a torch handle coupled to a second end of the lead. The quick disconnect is located at a proximal end of the torch handle, and may include at least one signal connection, a pilot connection, a fluid connection, and a main power connection. The fluid and power connection may be formed by a connection between a main power socket and a conductive conduit. Specifically, the main power socket includes a conductive spring and an O-ring encircling an interior bore of the main power socket. Removal of the conductive conduit from the main power socket causes the fluid connection to break between the O-ring and the conductive conduit, followed by the power connection to break between the conductive spring and the conductive conduit. As a result, the QDT handle of the present disclosure allows for a quicker exchange of the torch handle to accommodate different cutting head details or configurations without having to shut off the power source.

Turning now to FIG. 1, a plasma cutting/welding system 1 according to exemplary embodiments of the disclosure will be described. As shown, the plasma cutting/welding system (hereinafter "system") 1 includes a power source 2 coupled to a torch 5 by a lead 6, which may be available in a variety of lengths according to a specific application. As shown, the torch 5 includes a torch body/handle 12, which is detachably coupled to the lead 6 at an end 7 by a quick disconnect (QD) or a QD assembly 16, as will be described in greater detail below. The lead 6 may be connected at an opposite end 3 to the power supply 2 by a plug and socket connection 18, which may include a mating set of electrical and fluid conductors disposed therein. In some embodiments, the plug and socket connection 18 is also a quick disconnect.

Figure 2:
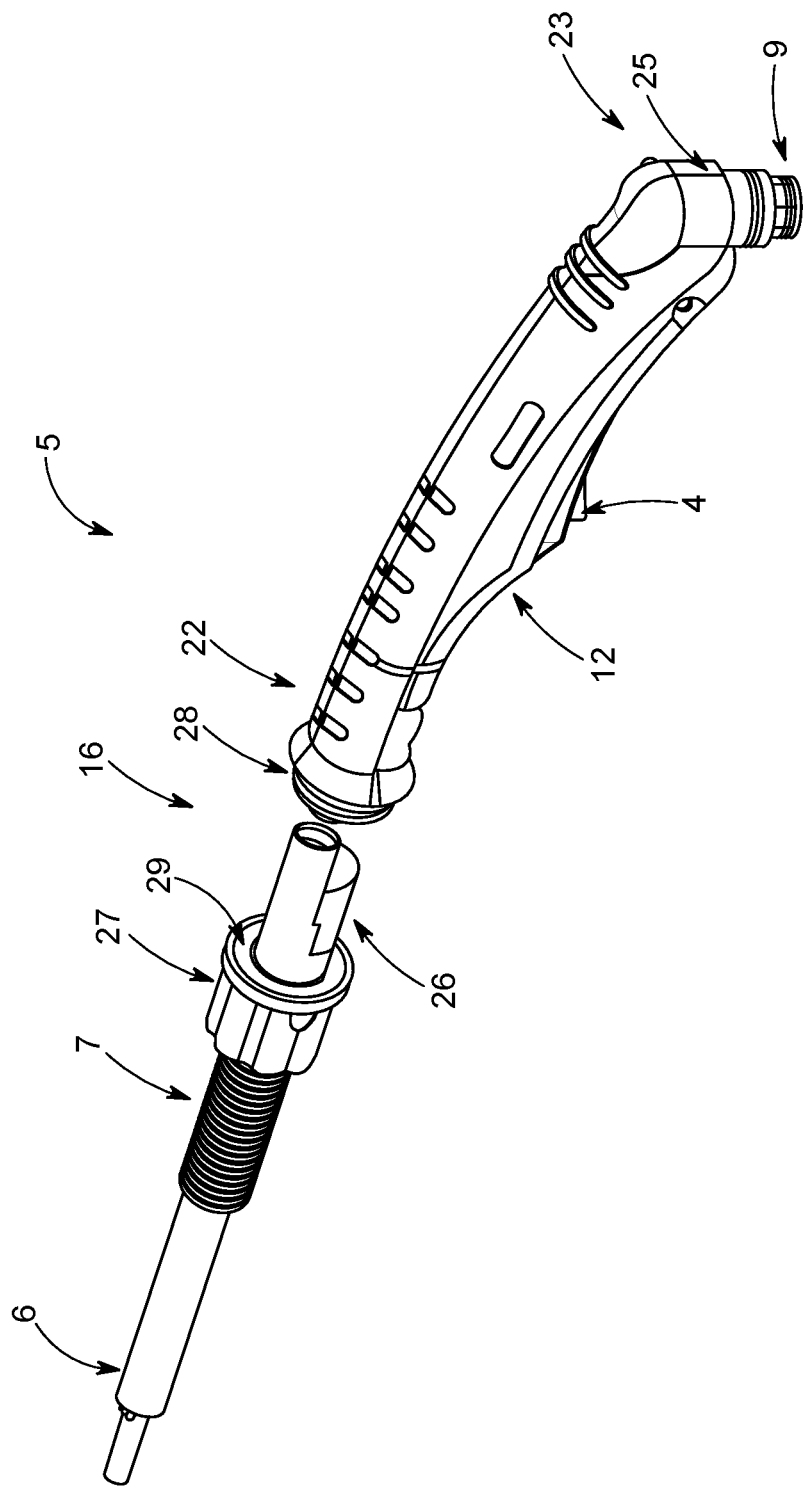
FIG. 2 is an isometric view of a quick disconnect of the system of FIG. 1 according to exemplary approaches of the disclosure.

Turning to FIG. 2, the torch 5 and the QD assembly 16 of the system 1 according to embodiments of the present disclosure will now be described in greater detail. As shown, the torch 5 may include the handle 12 having a proximal end 22 adjacent the QD assembly 16 and the lead 6, and a distal end 23 proximate a torch head 25. The QD assembly 16 may include a socket assembly 26 and a locking collar 27 coupled to the socket assembly 26, wherein the locking collar 27 is further coupled to the lead 6 as shown. The proximal end 22 of the handle 12 may include a connector 28, such as external ridges or threading, for mechanical engagement with an internal surface of the locking collar 27 when the QD assembly 16 is assembled. In exemplary embodiments, the handle 12 can be removed at the second end 7 of the lead 6 with a single revolution of the locking collar 27. Conversely, to install a replacement handle, the handle 12 is inserted and the locking collar 27 is counter rotated 360 degrees.

In operation, both gas and electric power are supplied to the torch head 25 through activation of a trigger system 4, which causes a power switch disposed within the handle 12 to activate the supply of gas and electric power. Alternately, the trigger system may activate the supply of gas with a gas control device (not shown) disposed within the handle 12, which is further described below. The power switch is in electrical communication with the power supply 2 (FIG. 1), which generates and supplies gas and electric power. Accordingly, both gas and electric power are delivered from the power supply 2, through the torch lead 6, and to the torch head 25 for generation of a plasma arc and a subsequent plasma stream that is ejected from a torch tip end 9. Therefore, the QD assembly 16 according to embodiments of the present invention is capable of conducting both gas and electric power for operation of a modular plasma arc torch 5. Furthermore, as used herein, the terms proximal, proximal direction, or proximal end should be construed as meaning towards or in the direction of the power supply 2, and the terms distal, distal direction, or distal end should be construed as meaning towards or in the direction of the torch head 25 and torch tip end 9 of the torch 5.

Figure 3:
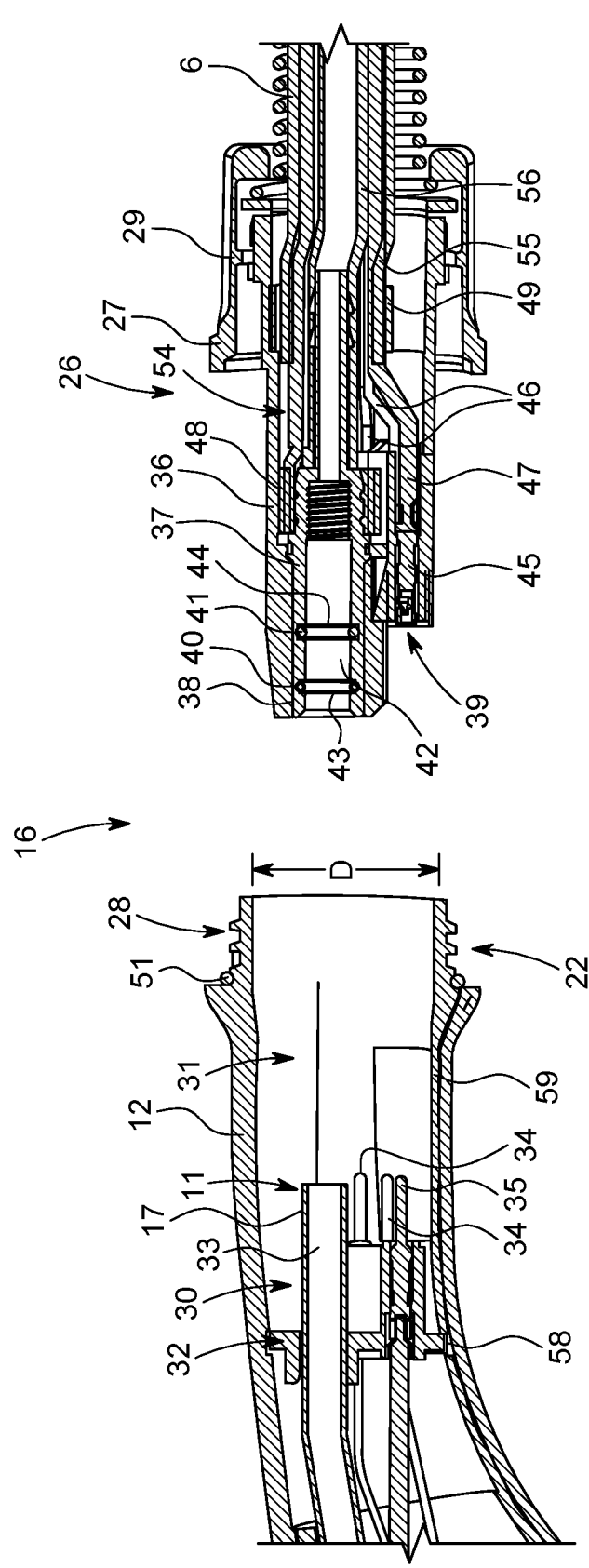
FIG. 3 is a side cutaway view of the quick disconnect of FIG. 2 according to exemplary approaches of the disclosure.
Figure 4:
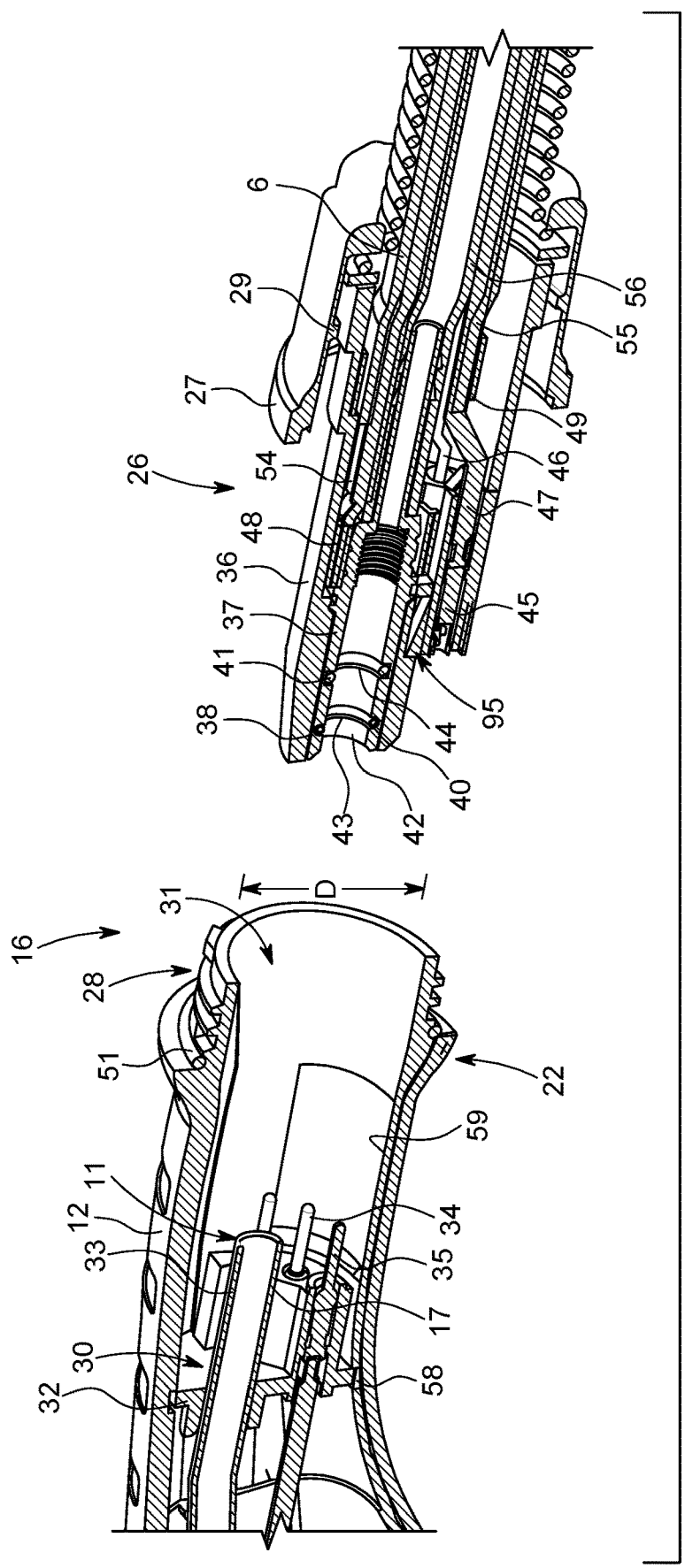
FIG. 4 is an isometric cutaway view of the quick disconnect of FIG. 2 according to exemplary approaches of the disclosure.

Turning now to FIGS. 3-4, the QD assembly 16 of the torch 5 in a disconnected configuration will be described in greater detail. As shown, a conductor assembly 30 of the QD assembly 16 is disposed within an interior 31 of the handle 12. The socket assembly 26 of the QD assembly 16 is coupled to the lead 6 and is disposed external to the handle 12 when the QD assembly 16 is in the disconnected configuration. When the torch 5 is fully connected, the socket assembly 26 and the conductor assembly 30 of the QD assembly 16 are coupled together within the interior 31 of the handle 12. In some embodiments, a locking ring 51 may encircle the proximal end 22 of the handle 12 to hold the handle 12 together, for example, in the case that the handle 12 includes multiple parts.

The conductor assembly 30 of the QD assembly 16 may include a conductive conduit 33, a set of signal pins 34, and a pilot pin 35. As shown, the conductive conduit 33, the set of signal pins 34, and the pilot pin 35 are disposed within the interior 31 of the handle 12 such that the conductive conduit 33, the set of signal pins 34, and the pilot pin 35 do not extend beyond the proximal end 22 of the handle 12. As a result, the conductive conduit 33, the set of signal pins 34, and the pilot pin 35 remain protected within the interior 31 of the handle 12. The conductor assembly 30 may further include an alignment device 32 disposed within the interior 31 of the handle 12, wherein the conductive conduit 33, the set of signal pins 34, and the pilot pin 35 extend through the alignment device 32. As shown, the alignment device 32 may extend across a diameter 'D' of the interior 31 of the handle 12, engaging a recess 58 formed in an interior wall 59 of the handle 12.

The socket assembly 26 of the QD assembly 16 may include a socket housing 36 and a main power socket 37 extending through a main power aperture 38 of the socket housing 36. The socket assembly 26 may further include one or more signal sockets 39 and a pilot socket 45, wherein the signal sockets and the pilot socket are respectively coupled to a set of signal lines 46 and a pilot line 47. A conductive spring 40 and an O-ring 41 are disposed along an interior bore 42 of the main power socket 37, as shown. In some embodiments, the interior bore 42 may include corresponding grooves 43 and 44 configured to receive the conductive spring 40 and the O-ring 41, respectively. The socket assembly 26 may further include a first ferrule 48 and a second ferrule 49 disposed concentrically about the main power socket 37. As shown, the first ferrule 48 is crimped around the main power socket 37 and secures multiple power wires 54 in place. Together the power wires 54, which may be 14 gauge, combined with main power socket 37, the conductive spring 40, and the conductive conduit 33, form a power circuit within the socket assembly 26. Furthermore, the second ferrule 49 is crimped around the exterior of a lead cover 55 (e.g., made from rubber), over the barbs of the main power socket 37, and around an interior gas tube 56 to secure the gas tube assembly.

Generally, the conductive conduit 33 and the main power socket 37 conduct both gas and high current from the power supply 2, through the lead 6, and to the torch 5. Further, the signal pins 34 and the signal pin sockets 39 conduct electricity for certain operations of the torch such as a trigger switch, electrical grounding, and/or a parts-in-place switch, among others. Additionally, the pilot pin 35 and the pilot pin socket 45 conduct electrical power that initiates a pilot arc for initiation of a plasma stream at the torch, which is generated as the gas is ionized by a high current conducted through the conductive conduit 33 and the main power socket 37.

In exemplary embodiments, the conductive conduit 33 extends through the interior 31 of the handle from the torch head 25, and includes a free end 11 that terminates within the interior 31, short of the proximal end 22 of the handle 12. In some embodiments, the free end 11 does not extend past the signal pins 34 and/or the pilot pin 35. The conductive conduit 33 may be a copper tube having a uniform diameter and a uniform sidewall thickness along its length. As shown, the free end 11 is not surrounded by or coupled to a fitting. Instead, the free end is "bare," thus permitting the interior bore 42 of the main power socket 37 to be in direct physical contact with an exterior surface 17 of the free end 11 of the conductive conduit 33. Eliminating the fitting from the free end 11 advantageously reduces the number of parts within the handle 12, and thus the overall cost of the torch 5, and advantageously permits a more direct connection between the conductive conduit 33 and the conductive spring 40 and the O-ring 41.

Figure 5:
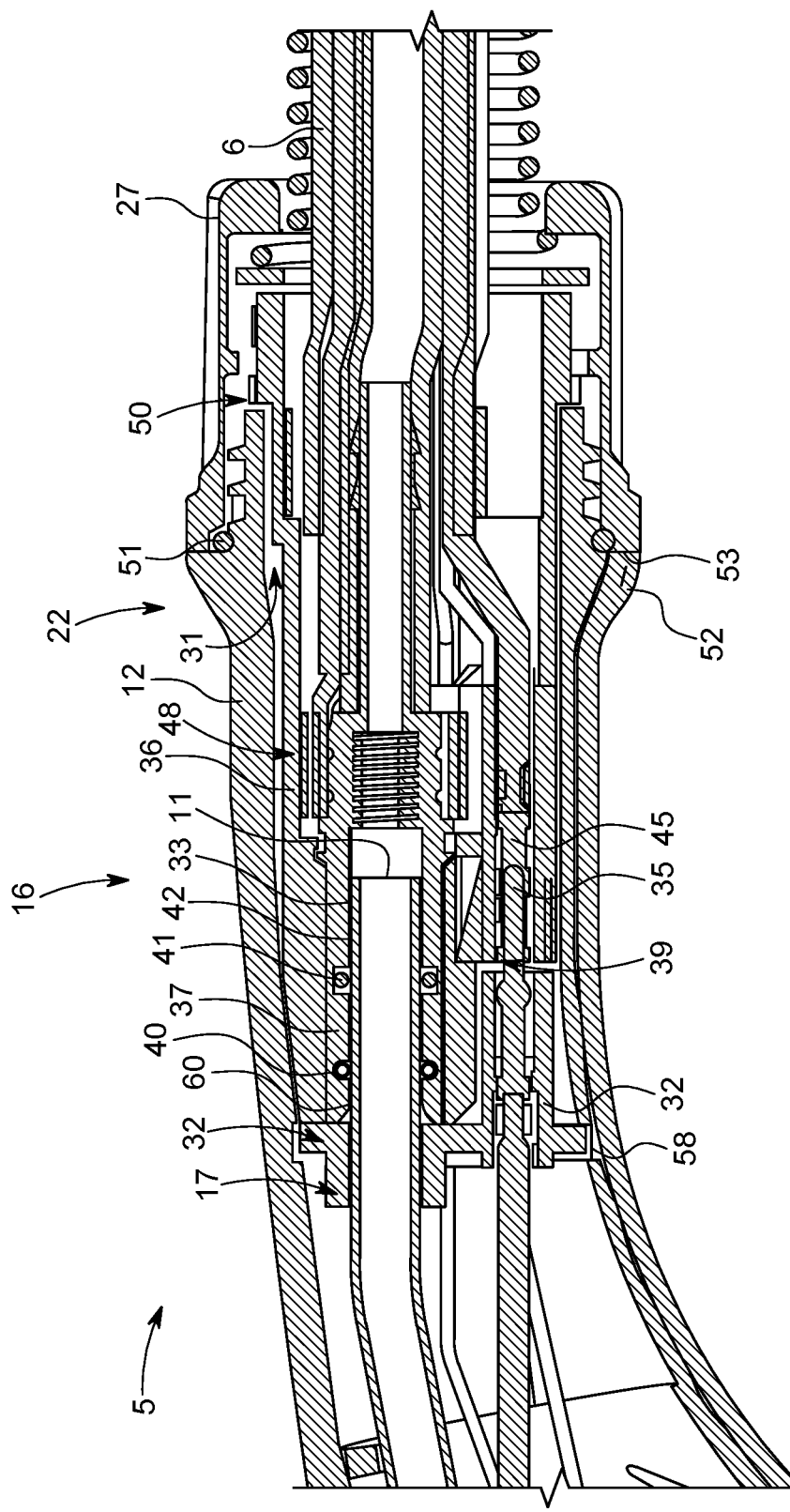
FIG. 5 is a side cross-sectional view of a quick disconnect according to exemplary approaches of the disclosure.
Figure 6:
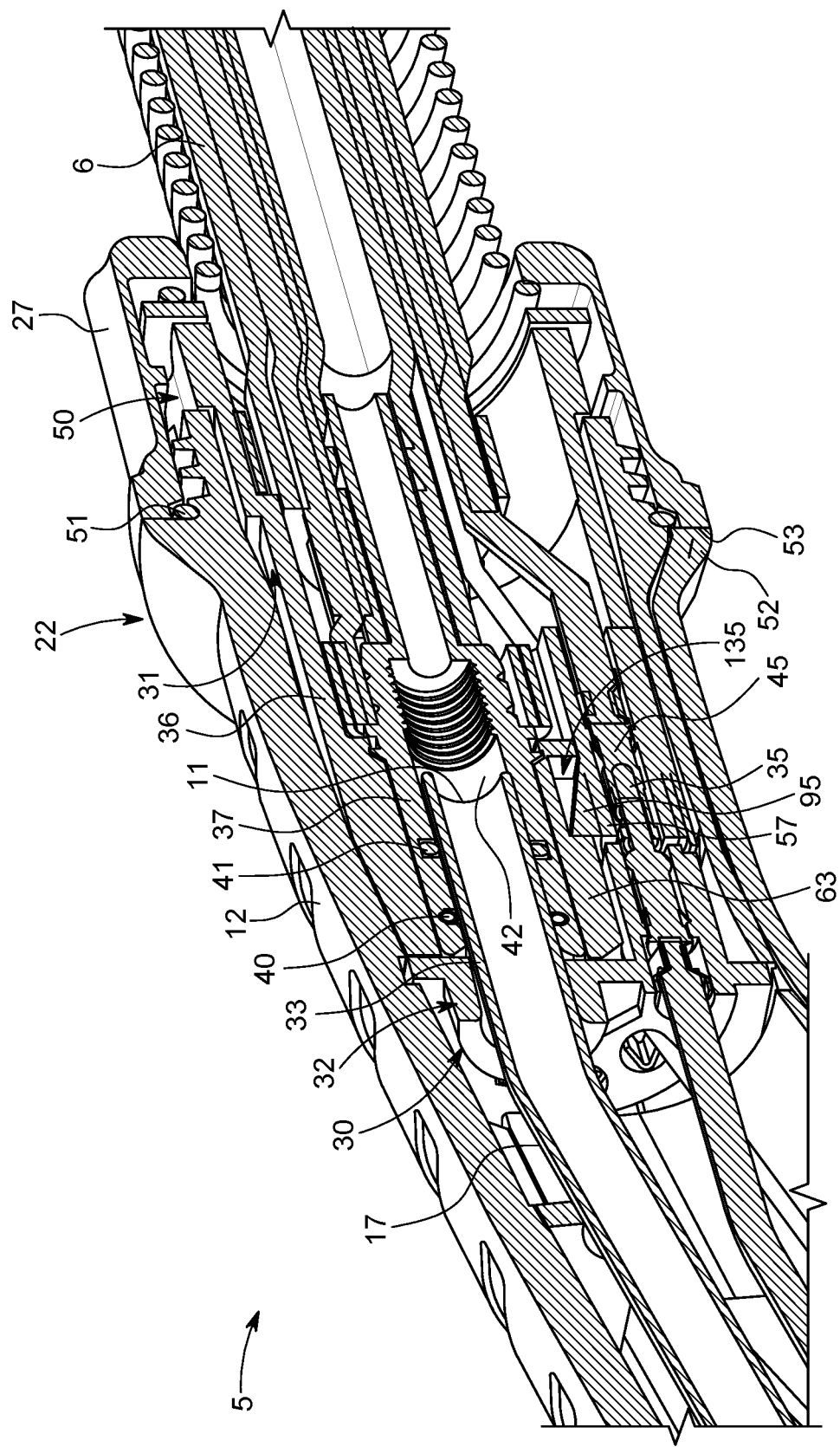
FIG. 6 is an isometric cutaway view of the quick disconnect of FIG. 5 according to exemplary approaches of the disclosure.

Turning now to FIGS. 5-6, the QD assembly 16 of the torch 5 in an assembled configuration will be described in greater detail. As shown, the handle 12 is engaged within an interior 50 of the locking collar 27, wherein the handle 12 may include a radially extending flange 52 configured to engage an end surface 53 of the locking collar 27 so as to prevent further axial movement of the locking collar 27 relative to the handle 12. In some embodiments, the socket housing 36 of the socket assembly 26 is in complementary mating abutment with the alignment device 32 of the conductor assembly 30 disposed within the interior 31 of the handle 12, as will be described in greater detail below.

As assembled, the socket assembly 26 is coupled together with the conductor assembly 30. Specifically, the QD assembly 16 at the proximal end 22 of the handle 12 includes at least one signal connection resulting from the engagement of the signal pins 34 with the signal sockets 39. A pilot connection may further be formed by the engagement of the pilot pin 35 and the pilot socket 45, while a fluid connection and a main power connection are formed by engagement of the conductive conduit 33 and the main power socket 37. In exemplary embodiments, the fluid connection is formed by engagement of the O-ring 41 with the conductive conduit 33 along the interior bore 42 of the main power socket 37, and the main power connection is formed by engagement of the conductive spring 40 with the conductive conduit 33.

As shown, the signal connection, the pilot connection, the fluid connection, and the main power connection of the QD assembly 16 occur within the interior 31 of the handle 12, between the proximal end 22 of the handle 12 and the distal end 23 (FIG. 2) of the handle 12. More specifically, the signal connection, the pilot connection, the fluid connection, and the main power connection if the QD assembly 16 occur within the interior 31 of the handle 12, between the proximal end 22 of the handle 12 and the trigger system 4 (FIG. 2). As a result, the QD assembly 16 allows detachment/reattachment of the handle 12 at the interface with the lead 6, for example, at the proximal end 22 of the handle 12.

During assembly, to achieve the fluid/main power connection, the conductive conduit 33 is inserted into and along the interior bore 42 of the main power socket 37. As shown, an exterior surface 17 of the conductive conduit 33 engages the conductive spring 40 to form an electrical/power connection therebetween. In some embodiments, the conductive spring 40 is a canted coil spring made from single or multi-metallic wires to achieve combinations of desired material characteristics of different metals. The conductive conduit 33 may compress the canted conductive spring 40 upon engagement such that the canted conductive spring 40 applies a radially inward force to help secure the conductive conduit 33 within the main power socket 37.

As the conductive conduit 33 is further inserted into the interior bore 42 of the main power socket 37, the exterior surface 17 of the conductive conduit 33 engages the O-ring 41 to form a gas/fluid seal therebetween. In one embodiment, the O-ring 41 is made from silicon. When used together, the conductive spring 40 and the O-ring 41 allow a single component, e.g., the conductive conduit 33, to provide gas and power to the distal end 23 of the handle 12.

As a result of the configuration of each connection of the QD assembly 16, such as the signal connection, the pilot connection, the fluid connection, and the main power connection, the order in which the connections are broken when the QD assembly 16 may be controlled according to the following non-limiting break sequence. For example, in one embodiment, the signal connection breaks before the pilot connection, the fluid connection, and the main power connection. Further, the pilot connection breaks after the signal connection and before the fluid connection and the main power connection. Then, the fluid connection breaks after the signal connection and the fluid (pilot) connection but before the main power connection. Finally, the main power connection breaks after the signal connection, the pilot connection, and the fluid connection, which results in improved operation of the torch 5. In one non-limiting embodiment, the break sequence occurs over a relatively small disconnect distance, e.g., while the conductive conduit 33 travels approximately 22 millimeters in a distal direction away from the lead 6.

More specifically, in one embodiment, when the QD assembly 16 is initially disengaged, the signal connection between the set of pins 34 and the corresponding signal sockets 39 breaks first. Accordingly, the power supply 2 (FIG. 1) experiences an action similar to letting go of the torch switch when the QD assembly 16 is disengaged. If the QD assembly 16 is disengaged while the plasma arc torch is in operation, the signal connection would break first, causing the power supply to stop outputting power through the main power connection formed by the conductive conduit 33 and the main power socket 37, and the pilot connection formed by the pilot pin 35 and the pilot socket 45.

Furthermore, in some embodiments, a plurality of signal connections may be disposed within the QD assembly 16 and, in one preferred form, a total of four (4) signal pins 34 are employed within the QD assembly 16. Moreover, the signal connection may also be sequenced to break in a specific order, for example, breaking the trigger switch signal before the parts-in-place signal, among other possible variations specific to the different signal connections within the QD assembly 16. In one embodiment, the length for the trigger switch signal connection may be shorter than the length for the parts-in-place switch signal connection. As a result, a variety of lengths of the signal connections may also be employed to sequence disconnection of various signals within the torch 5. In other embodiments, the break sequencing/timing of the signal and pilot connection breaks is controlled by the stepped location of the main power sockets 37 and the pilot socket 45.

As the QD assembly 16 is further disengaged, the pilot connection breaks after the signal connection. Accordingly, the pilot connection is broken before the fluid connection such that there does not exist a possibility of trying to pilot the plasma arc torch without gas flow. Generally, the presence of gas flow provides an audible indication to the user that power is present at the torch and that the torch may pilot at any time. With the pilot connection breaking before the fluid connection, an additional safety feature is thereby provided to the operator.

As the QD assembly 16 is further disengaged, the fluid connection breaks after the signal connection and the pilot connection. In exemplary embodiments, the fluid connection between the O-ring 41 and the conductive conduit 33 is broken when a proximal or free end 11 of the conductive conduit 33 retracts past the O-ring 41 as the conductor assembly 30 moves away from the socket assembly 26. Since the fluid connection breaks after the signal connection and the pilot connection, gas is prevented from leaking out of the QD assembly 16 when the QD assembly 16 is not fully engaged. Furthermore, since the fluid connection is timed to break after the signal connection and the pilot connection, the plasma arc torch would not function, and would further not leak gas, if the QD assembly 16 were not fully engaged.

As the QD assembly 16 is still further disengaged, the main power connection breaks after the signal connection, the pilot connection, and the fluid connection. For example, the power connection between the conductive spring 40 and the conductive conduit 33 is broken when the proximal end 11 of the conductive conduit 33 retracts past the conductive spring 40 as the conductor assembly 30 moves away from the socket assembly 26. Because the main power connection is a relatively high current conducting member within the QD assembly 16, breaking the main power connection last in the sequence reduces the possibility of drawing an arc if the QD assembly 16 is inadvertently disengaged during operation of the torch 5.

Figure 7:
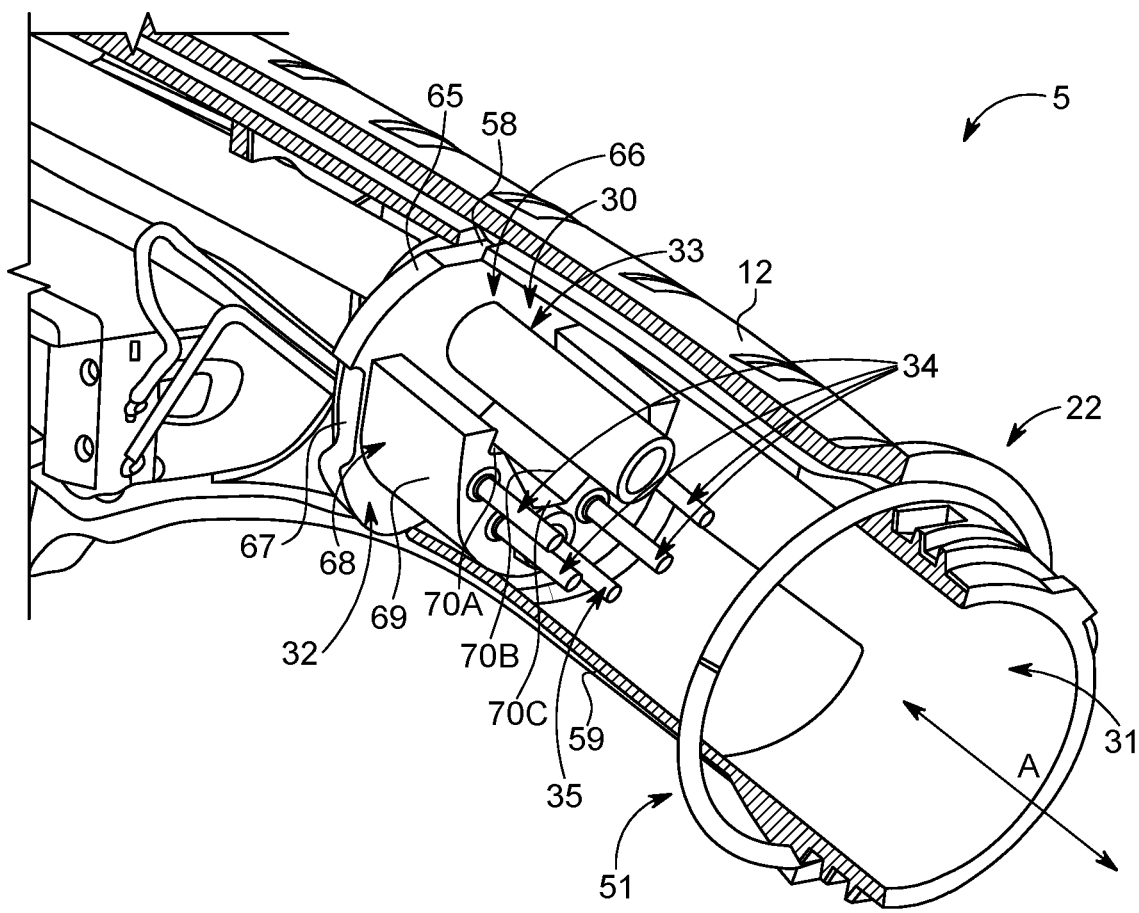
FIG. 7 is an isometric partial cutaway view of a conductor assembly of a quick disconnect according to exemplary approaches of the disclosure.
Figure 8:
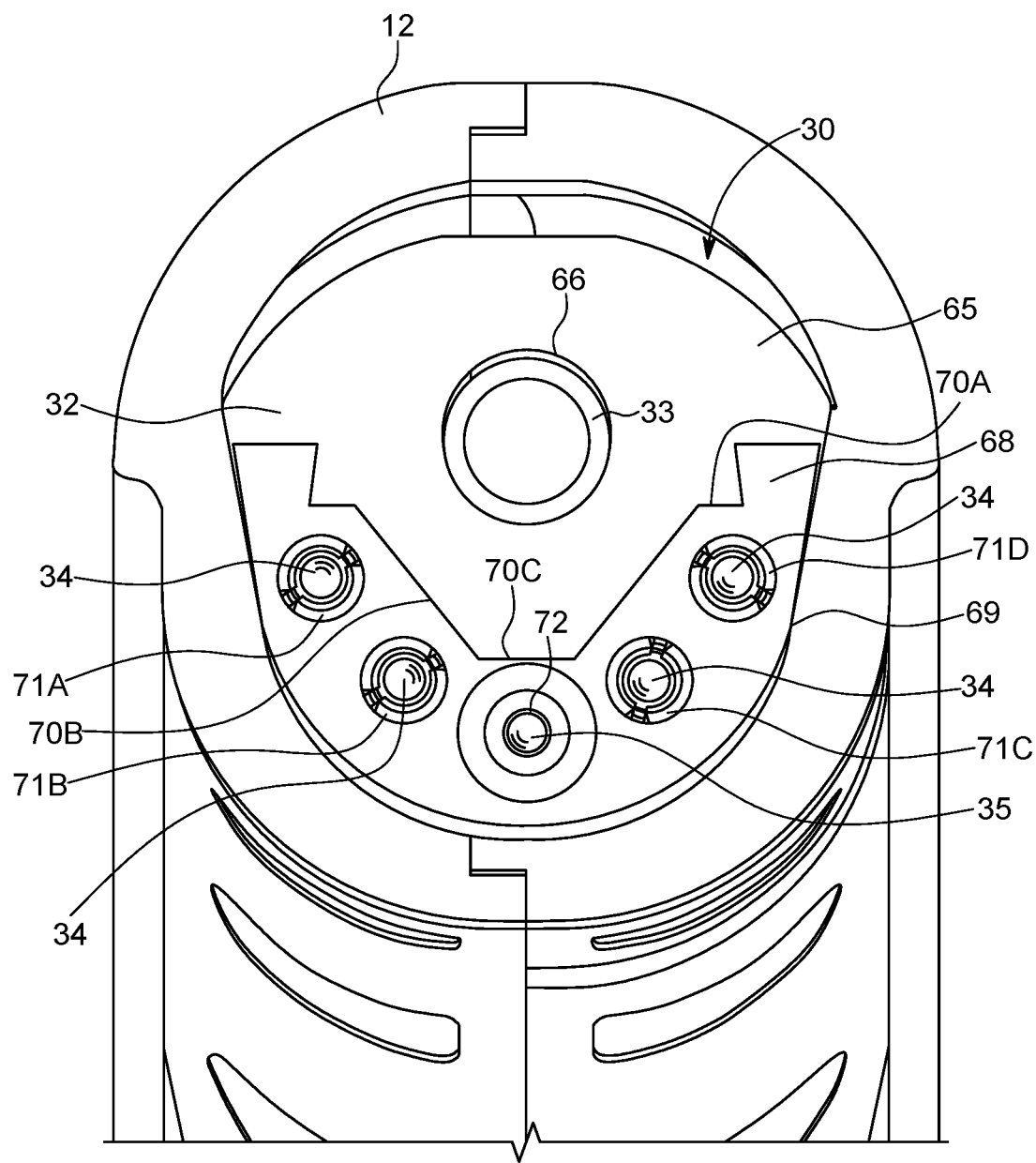
FIG. 8 is an end view of the conductor assembly of FIG. 7 according to exemplary approaches of the disclosure.

Referring now to FIGS. 7-8, the conductor assembly 30 of the torch 5 will be described in greater detail. As shown, the conductor assembly 30 of the QD 16 includes the conductive conduit 33, the set of signal pins 34, and the pilot pin 35 disposed within the interior 31 of the handle 12 at the proximal end 22 thereof. The conductive conduit 33, the set of signal pins 34, and the pilot pin 35 terminate within the proximal end 22 of the handle, as shown, such that the conductive conduit 33, the set of signal pins 34, and the pilot pin 35 do not extend outside of the handle, for example, beyond the proximal end 22 of the handle 12 along an axial direction indicated by arrow 'A.' As a result, the proximal ends of each of the conductive conduit 33, the set of signal pins 34, and the pilot pin 35 remain protected within the interior 31 of the handle 12, for example, in a position between the trigger system 4 and the proximal end 22 of the handle 12.

The alignment device 32 is disposed within the interior 31 of the handle 12, and is configured to provide support to the conductive conduit 33, the set of signal pins 34, and the pilot pin 35, all of which extend through openings in the alignment device 32. As shown, the alignment device 32 may include an end wall 65 extending across the interior 31 of the handle 12. In some embodiments, the end wall 65 is oriented perpendicular, or substantially perpendicular, to the axial direction 'A,' and is secured in place by one or more recesses 58 formed in the interior wall 59 of the handle 12. The end wall 65 may include an opening 66 formed therein, the opening 66 being sized to permit the conductive conduit 33 to pass therethrough. In some embodiments, the end wall 65 may include one or more cutouts 67 along an outer perimeter thereof. The cutouts 67 are provided so as to allow more material at this location in the handle 12 to structurally strengthen the handle 12. The cutouts 67 may also help locate and align alignment device 32 in the handle 12.

The alignment device 32 further includes a seating support 68 extending from the end wall 65, for example as shown. In some embodiments, the seating support 68 extends perpendicularly from the end wall 65, and includes a generally U-shaped outer surface 69 and a set of interior surfaces 70A-C forming a profile configured to matingly engage the socket housing 36 of the socket assembly 26, as will be described in greater detail below. The seating support 68 further includes a set of signal pin apertures 71A-D and a pilot pin aperture 72 configured to respectively permit the signal pins 34 and the pilot pin 35 to pass therethrough.

Figure 9:
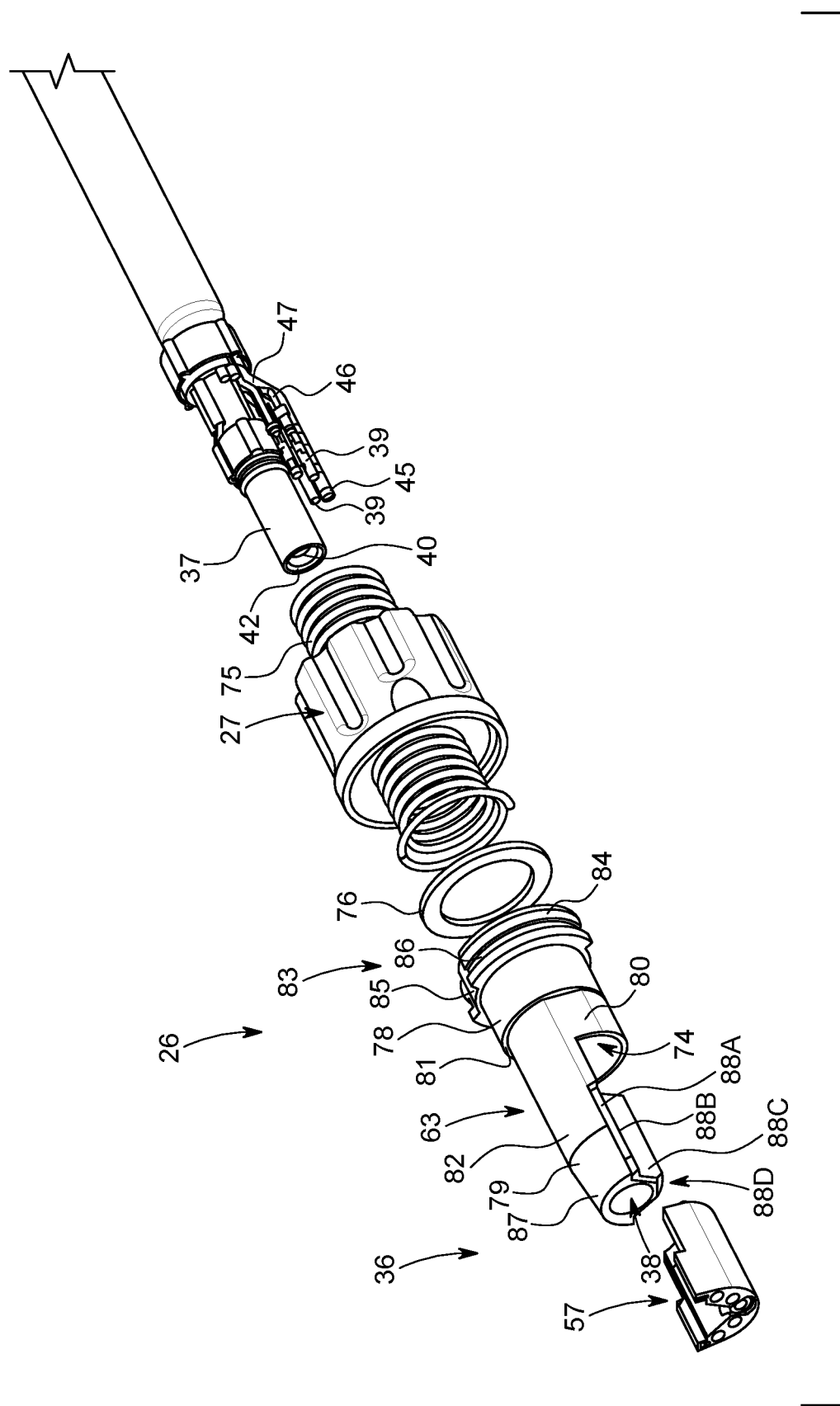
FIG. 9 is an exploded view of the socket assembly of a quick disconnect according to exemplary approaches of the disclosure.
Figure 10A:
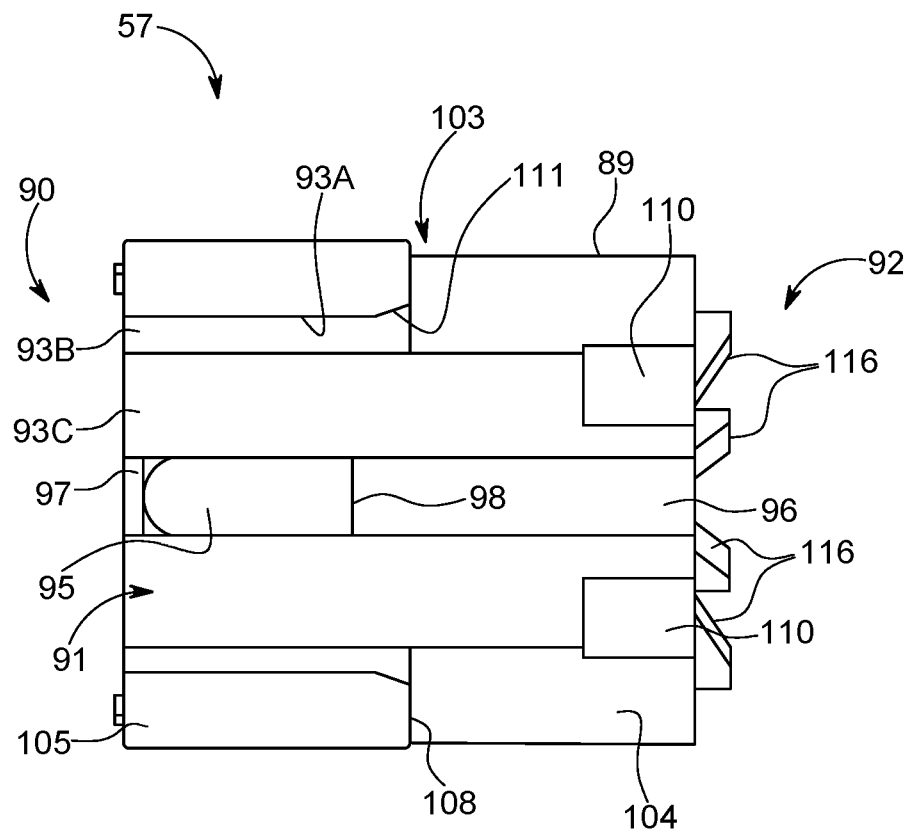
FIGS. 10A-D are respective views of a first section of the socket assembly of FIG. 9 according to exemplary approaches of the disclosure.
Figure 10B:
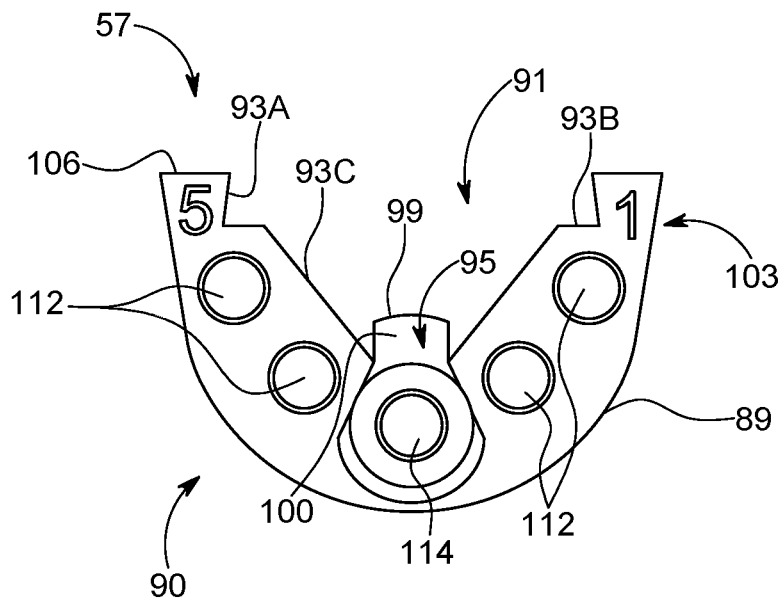
Figure 10C:
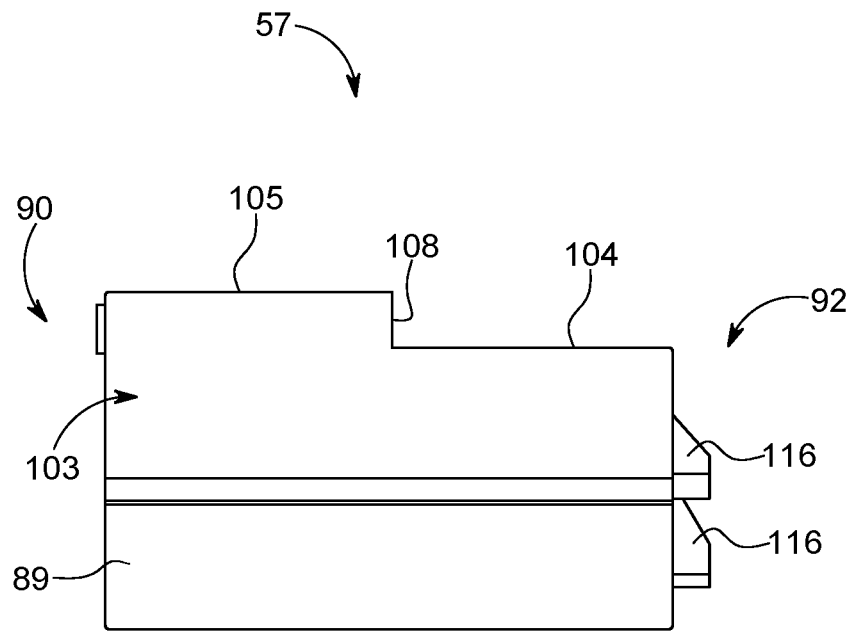
Figure 10D:
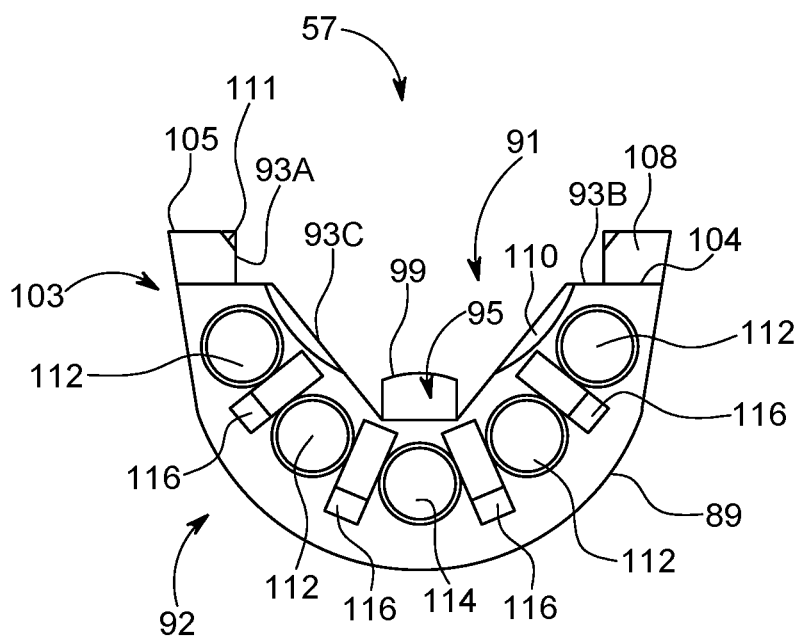

Referring now to FIG. 9, the socket assembly 26 of the torch 5 will be described in greater detail. As shown, the socket assembly 26 of the QD assembly 16 includes the socket housing 36 having a first section 57 and a second section 63, wherein the main power socket 37 extends through the main power aperture 38 of the second section 63 of the socket housing 36. The socket assembly 26 may further include the signal sockets 39 extending from the signal lines 46, and the pilot socket 45 extending from the pilot line 47. The signal sockets 39 and the pilot socket 45 extend through a primary aperture 74 in the socket housing 36, and are generally parallel with the main power socket 37. The conductive spring 40 and the O-ring 41 (not shown) are disposed along the interior bore 42 of the main power socket 37. The socket assembly 26 may further include the locking collar 27 concentrically surrounding a spring (e.g., a strain relief spring) 75 and a washer 76, which may be made from Teflon.

In some embodiments, the second section 63 of socket housing 36 includes a main body 78 and a distal extension 79 extending from the main body 78. As shown, the main body 78 includes the primary aperture 74, while the distal extension 79 includes the main power aperture 38. A central longitudinal axis of the primary aperture 74 and a central longitudinal axis of the main power aperture 38 may be offset and parallel with one another. The main body 78 may include a flattened cam surface 80 and a ridge 81 along an exterior surface 82 configured for engagement with the first section 57 of the socket housing 36, as described in greater detail below. A proximal end 83 of the socket housing 36 may include a set of locking ridges 84 configured to engage a locking ring 29 (FIGS. 3-4) disposed along an inner surface of the locking collar 27. During assembly, the locking ring 29 may be aligned with an axial passageway 85 at the proximal end 83, and the locking collar 27 then rotated to cause the locking ring 29 to travel circumferentially in a channel 86 provided between each of the set of locking ridges 84.

In exemplary embodiments, the distal extension 79 extends perpendicularly from the main body 78 of the socket housing 36, and includes a generally semicircular outer surface 87 and a set of feature surfaces 88A-C that form a profile configured to matingly engage the set of interior surfaces 70A-C (FIGS. 7-8) of the seating support 68 of the conductor assembly 30. For example, when the seating support 68 is brought into contact with the distal end 77 of the second section 63 of the socket housing 36, the interior surface 70A abuts the feature surface 88A, the interior surface 70B abuts the feature surface 88B, and the interior surface 70C abuts the feature surface 88C. When engaged together, the opposing/mating profiles of the seating support 68 and the second section 63 prevent rotation between the socket housing 36 relative to the alignment device 32.

Turning now to FIGS. 10A-D, the first section 57 of the socket housing 36 will be described in greater detail. As shown, the first section 57 is a substantially semicircular component having a distal end 90 and a proximal end 92, and an interior channel 91 extending therebetween. The first section 57 may include a substantially U-shaped outer surface 89 and a set of interior surfaces 93A-C defining a profile configured to matingly engage the second section 63 of the socket housing 36 of the socket assembly 26, as will be described in greater detail below. In exemplary embodiments, the first section 57 further includes a protrusion 95 extending into the interior channel 91 from a lower surface 96. The protrusion 95 may include a distal end 97 and a proximal end 98, wherein the distal end 97 defines an apex 99 and a distal face 100 configured to engage the second section 63. In some embodiments, the protrusion 95 may slope downwards towards the proximal end 98 until the protrusion 95 intersects with the lower surface 96.

The first section 57 of the socket housing 36 may include a stepped sidewall 103 including a lower ledge 104 and an upper ledge 105. A proximal facing surface 108 connects the lower ledge 104 and the upper ledge 105, and is configured to engage the distal extension 79 of the second section 63 of the socket housing 36. The proximal end 92 of the first section 57 may include a first bevel 110 extending along the interior surface 93C. A second bevel 111 extends along the interior surface 93A of the upper ledge 105. In some embodiments, the first bevel 110 and the second bevel 111 are included to ease the interference fit between the first section 57 and the second section 63 of the socket housing 36 during sliding engagement.

The first section 57 may further include a set of signal pin apertures 112 and a pilot pin aperture 114 extending between the distal end 90 and the proximal end 92. The set of signal pin apertures 112 and the pilot pin aperture 114 are provided to permit, respectively, the signal pins 34 and the pilot pin 35 (FIG. 9) to pass therethrough. One or more projections 116 are provided between the signal pin apertures 112 and the pilot pin aperture 114 to provide support and separation for the signal pins 34 and the pilot pin 35 once the first section 57 and the second section 63 are joined.

Figure 11A:
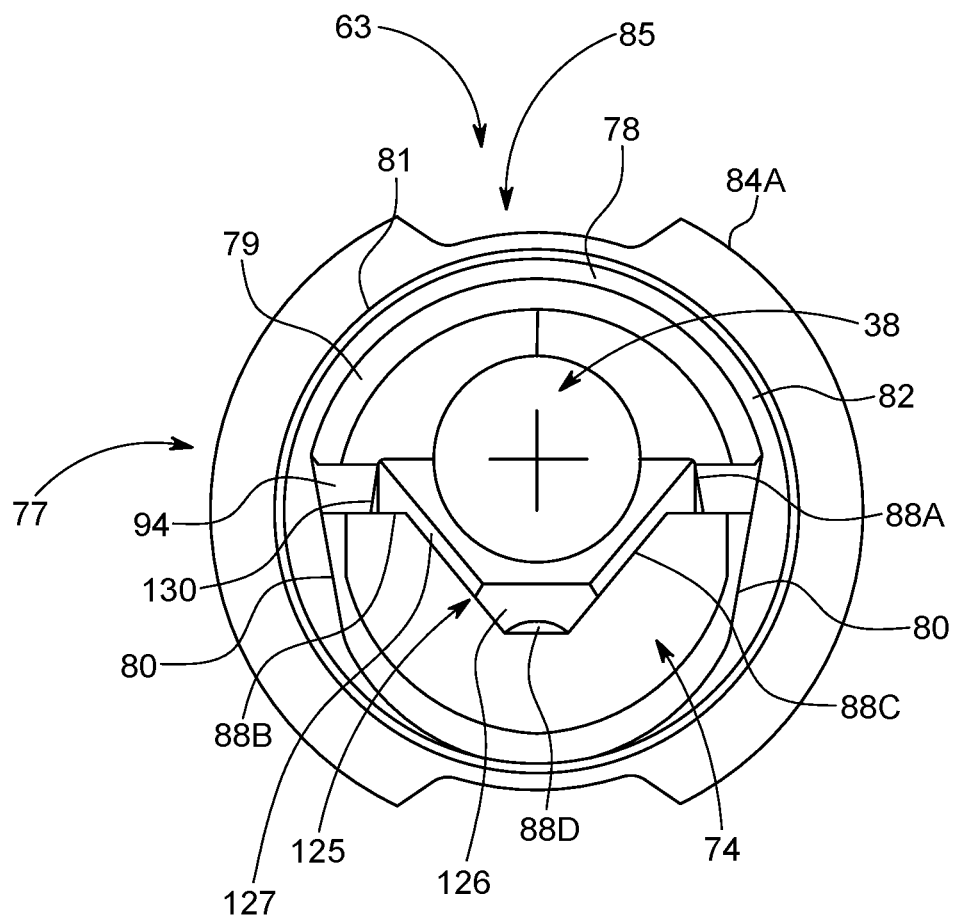
FIGS. 11A-C are respective views of a second section of the socket assembly of FIG. 9 according to exemplary approaches of the disclosure.
Figure 11B:
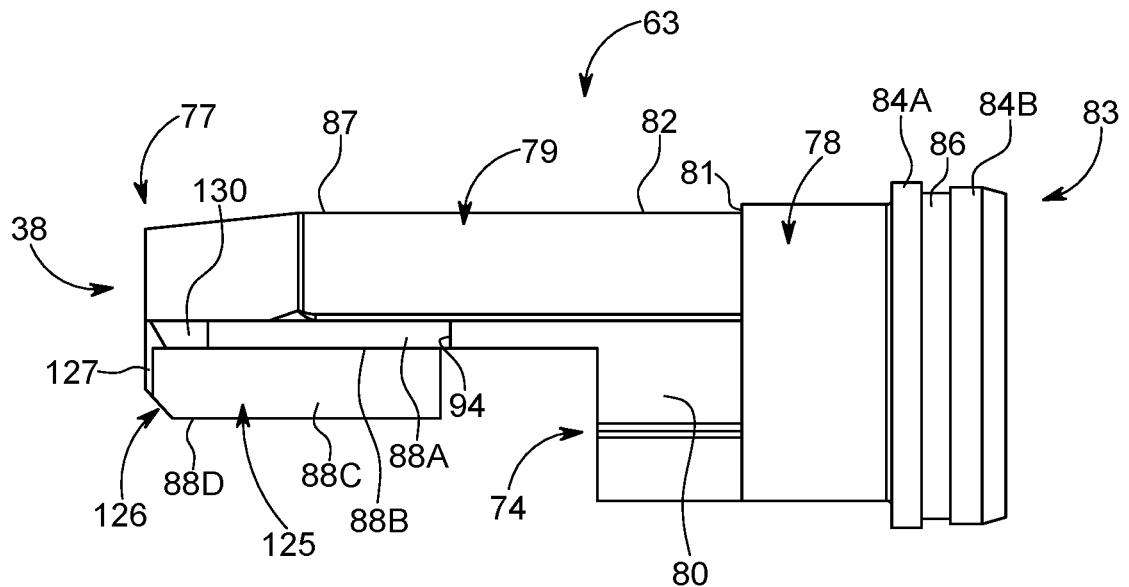
Figure 11C:
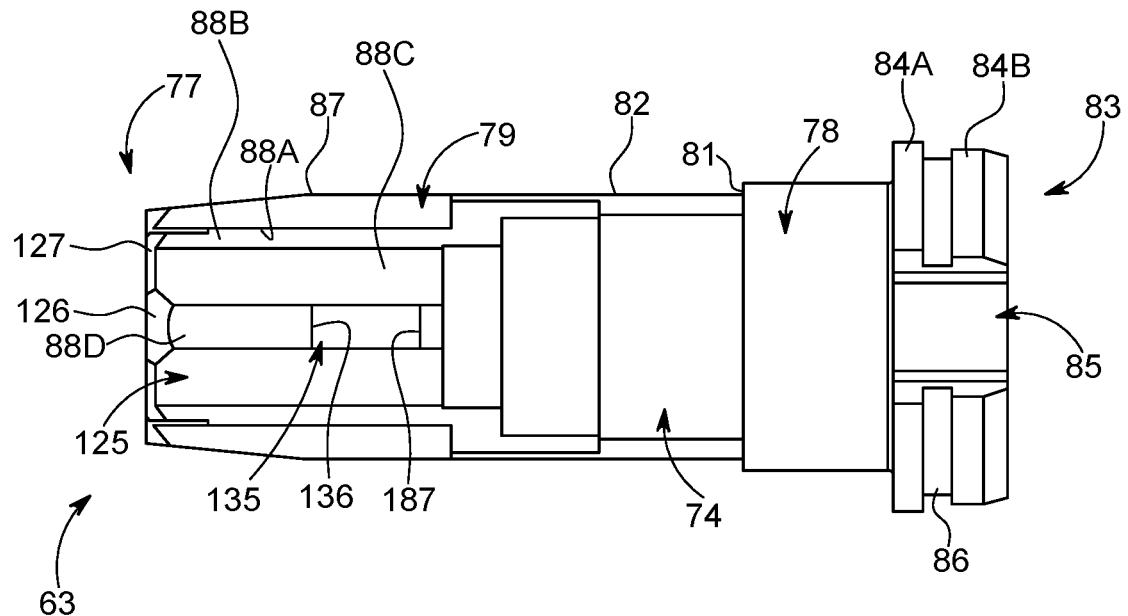
Figure 12:
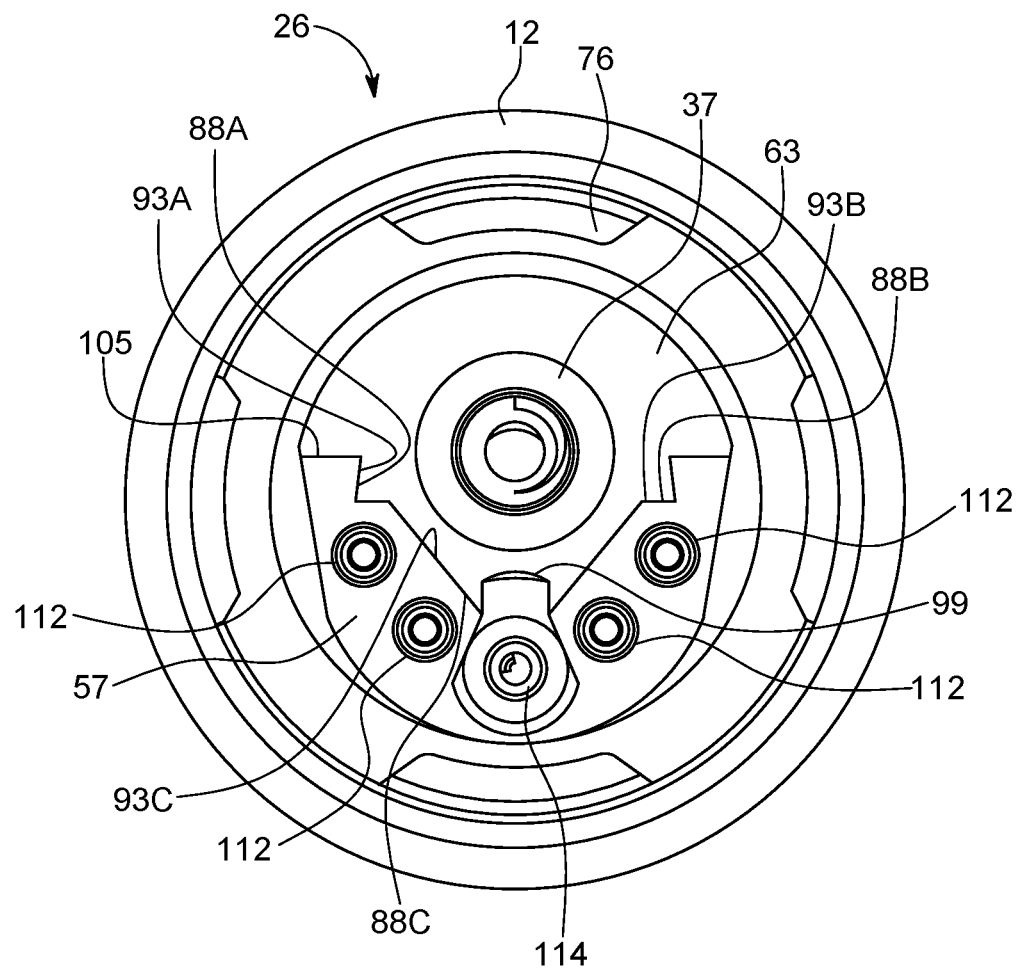
FIG. 12 is an end view of the socket assembly of FIG. 9 according to exemplary approaches of the disclosure.
Figure 13:
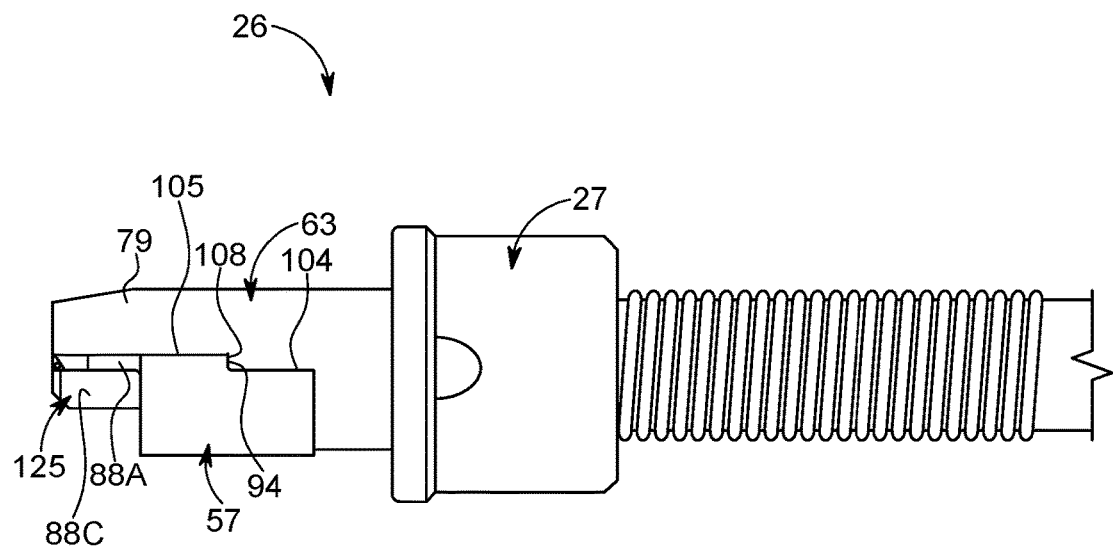
FIG. 13 is a side view of the socket assembly according to exemplary approaches of the disclosure.

Turning now to FIGS. 11A-C, the second section 63 of the socket housing 36 will be will be described in greater detail. As shown, the second section 63 of the socket housing 36 includes the main body 78 and the distal extension 79 extending from the main body 78. The main body 78 includes the primary aperture 74, while the distal extension 79 includes the main power aperture 38. The main body 78 may include one or more cam surfaces 80 and the ridge 81 along the exterior surface 82 thereof. The proximal end 83 of the second section 63 may include the set of locking ridges 84A-B configured to engage the locking collar 27 (not shown). During assembly, the locking ring 29 of the locking collar 27 may slide along the axial passageway 85 at the proximal end 83, and then along the channel 86 defined by the set of locking ridges 84A-B.

In exemplary embodiments, the distal extension 79 extends perpendicularly from the main body 78 of the second section 63, and includes a generally semicircular outer surface 87. The set of feature surfaces 88A-C define a profile configured to matingly engage the set of interior surfaces 70A-C (FIGS. 7-8) of the seating support 68 of the conductor assembly 30, as well as with the first section 57. In one embodiment, the set of feature surfaces 88A-C define a socket ridge 125 that extends partially along the distal extension 79 of the second section 63. The socket ridge 125 may include a beveled distal end 126 and an angled leading edge 127 to ease passage of first section 57 along the second section 63 during assembly. As further shown, the second section 63 may include a beveled face 130 of the feature surface 88A at the distal end 77 thereof, as well as a distal facing flange 94 for engaging the first section 57. The feature surface 88D may include a recess 135 defined by a distal end wall 136 and a proximal end wall 137. The recess 135 may be dimensioned to receive the protrusion 95 of the first section 57 of the socket housing 36, as will be described in greater detail below.

Turning now to FIGS. 10-14, the socket housing 36 including the first section 57 and the second section 63 joined together will be described in greater detail. As shown, when the first section 57 is brought into contact with the second section 63 of the socket housing 36, the interior surface 93A abuts the feature surface 88A, the interior surface 93B abuts the feature surface 88B, and the interior surface 93C abuts the feature surface 88C. The lower surface 96 and the protrusion 95 are in abutment with the feature surface 88D. In some embodiments, the lower ledge 104 of the stepped sidewall 103 of the first section 57 extends along the cam surfaces 80 of the second section 63 to prevent rotation of the first section 57 relative to the second section 63. The proximal facing surface 108 connecting the lower ledge 104 and the upper ledge 105 engages the distal facing flange 94 of the distal extension 79. The opposing/mating profiles of the feature surfaces 88A-C and the interior surfaces 93A-C permit relative movement/alignment between the first section 57 and the second section 63 in only one orientation. Furthermore, once engaged together, the feature surfaces 88A-C and the interior surfaces 93A-C prevent rotation between the first section 57 and the second section 63.

Figure 14:
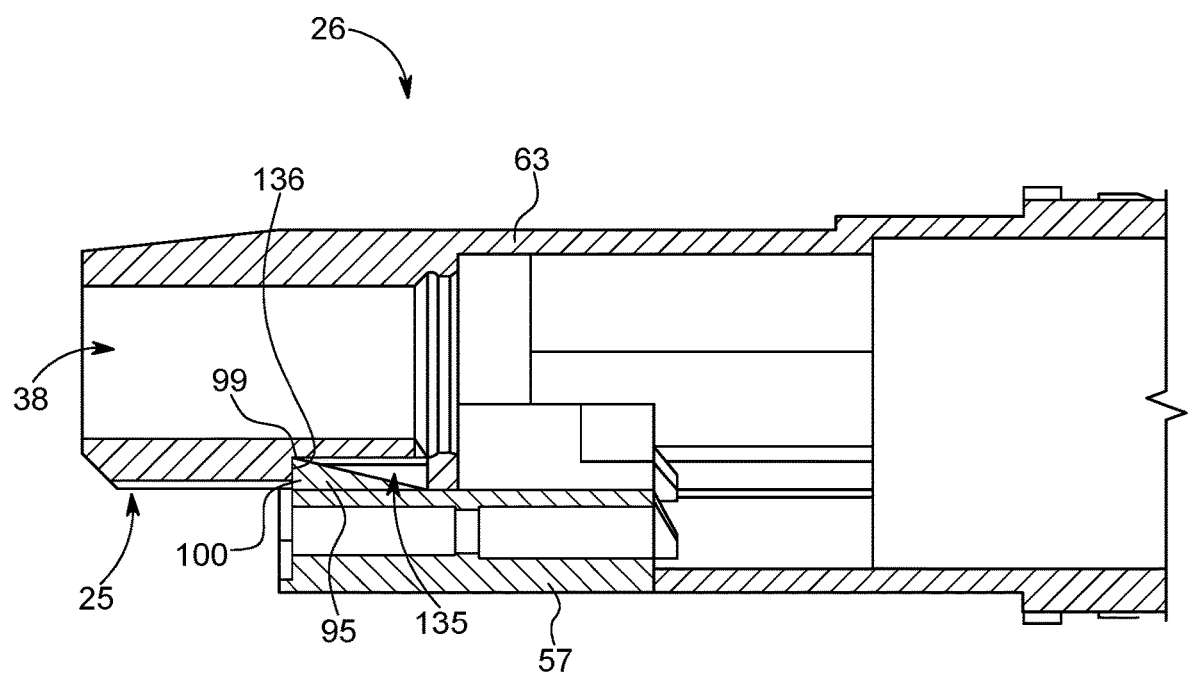
FIG. 14 is a side cross-sectional view of the socket assembly of FIG. 13 according to exemplary approaches of the disclosure.
Figure 15A:
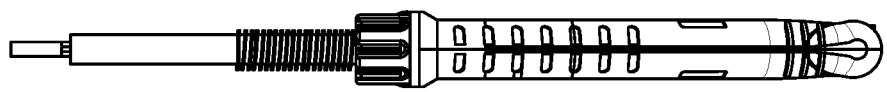
FIGS. 15A-E are various views of a torch according to exemplary approaches of the disclosure.
Figure 15B:
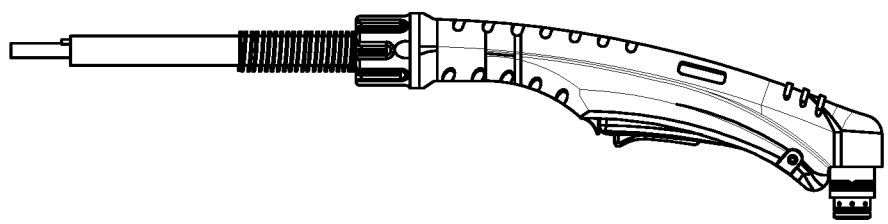
Figure 15C:
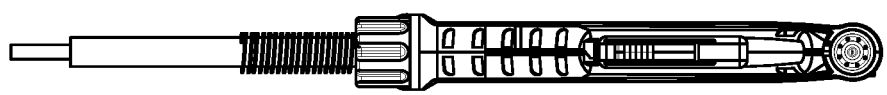
Figure 15D:
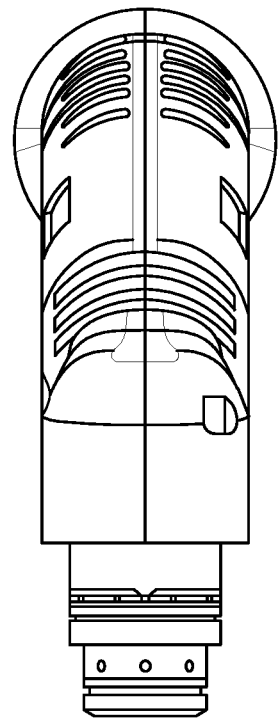
Figure 15E:
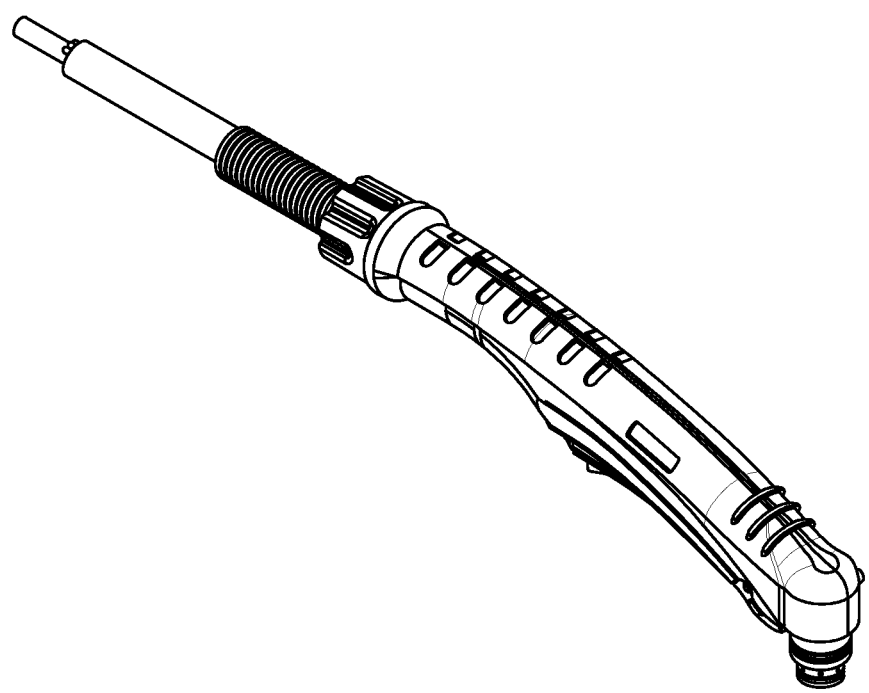
Figure 16A:
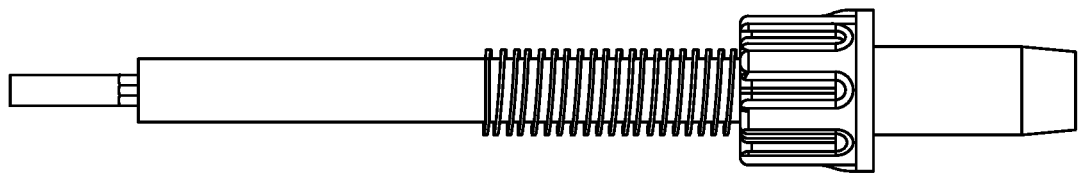
FIGS. 16A-E are various views of the socket assembly of the torch of FIGS. 15A-E according to exemplary approaches of the disclosure.
Figure 16B:
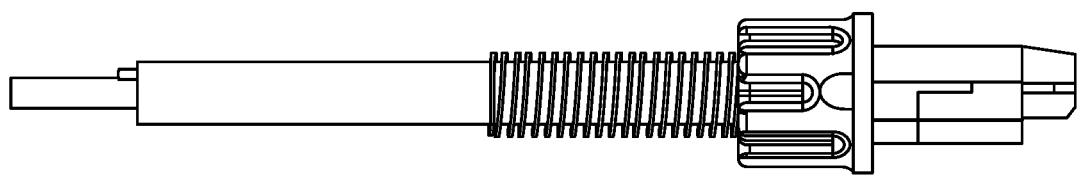
Figure 16C:
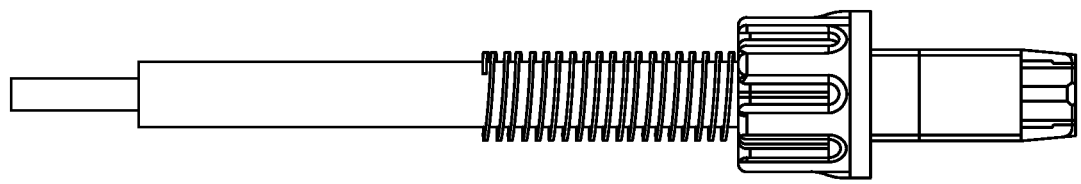
Figure 16D:
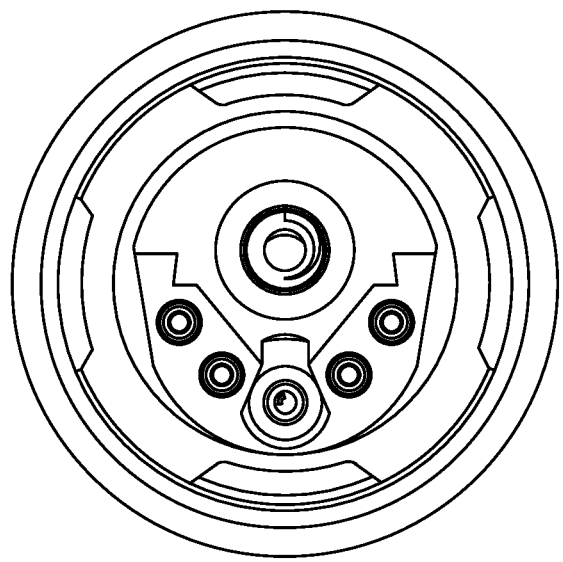
Figure 16E:
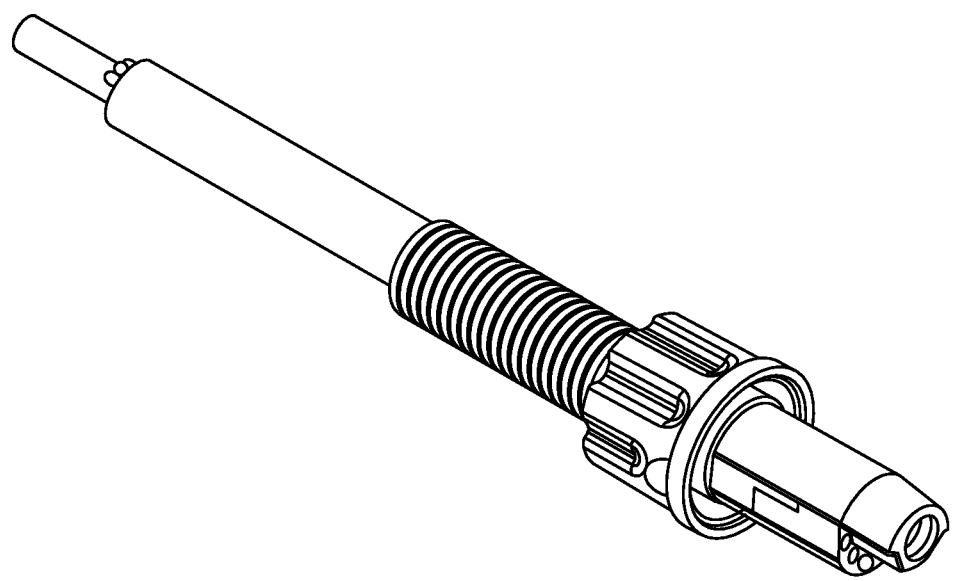

As shown in FIG. 14, the recess 135 provided in the feature surface 88D of the second section 63 receives the protrusion 95 of the first section 57 therein. More specifically, the distal end wall 136 engages the apex 99 and the distal face 100 of the protrusion 95 to lock the first section 57 in place relative to the second section 63. As shown, the protrusion 95 may be sloped so as to permit the first section 57 and the second section 63 to initially slide past one another during assembly until the apex 99 and distal face 100 pass the distal end wall 136, which causes the protrusion to move into the recess 135. In some non-limiting embodiments, the first section 57 and the second section 63 can then only be separated by a user controlled switch or tool (not shown).

FIGS. 15A-E depict various views of the torch according to exemplary approaches of the disclosure, and FIGS. 16A-E depict various views of the socket assembly of the torch of FIGS. 15A-E according to exemplary approaches of the disclosure.

In sum, disclosed herein are approaches for providing a quick disconnect within a torch handle. A first advantage of the QD handle of the disclosure includes the ability to more quickly replace a damaged or malfunctioning torch handle with little interruption to the work flow. A second advantage of the QD handle of the disclosure results from the break position of the conductors within the torch handle. The signal and pilot contacts and sockets, as well as the conductive conduit and the main power socket, engage/disengage deep within the torch handle in an isolated and protected location. A third advantage of the QD handle is the ease of alignment between the socket assembly and the conductor assembly due to the corresponding mating geometries of the seating support and the socket housing. A fourth advantage of the QD handle is that a single lead may be used with a power source. The handle can be removed and replaced, at the torch lead end, with a single revolution of a locking collar. A fifth advantage of the QD handle is the ability to remove the handle while the torch is still powered. There is no need to shut off the power source to effectuate the handle change, further reducing work flow interruption. A sixth advantage of the QD handle of the disclosure is its plug and play capability. A replacement plasma torch can be used on any different power supplies, for example, with or without an adapter kit. A seventh advantage of the QD handle is its smaller size, which facilitates ease of storage and display.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

The invention claimed is:

1. A system comprising:
   a lead having a first end connected to a power source;
   a torch including a handle, the handle coupled to a second end of the lead; and
   a quick disconnect assembly disposed within an interior of the handle proximate to a proximal end of the handle, the quick disconnect assembly comprising at least one signal connection, a pilot connection, a fluid connection, and a main power connection, wherein the at least one signal connection, the pilot connection, the fluid connection, and the main power connection terminate at locations within the interior of the handle that are spaced from the proximate end of the handle.

2. The system according to claim 1, the quick disconnect assembly comprising a conductive conduit, a set of signal pins, and a pilot pin.

3. The system according to claim 2, further comprising an alignment device disposed within the interior of the handle, wherein the conductive conduit, the set of signal pins, and the pilot pin extend through the alignment device.

4. The system according to claim 3, the quick disconnect assembly comprising:
   a socket assembly; and
   a locking collar coupled to the socket assembly, the locking collar connected to the lead.

5. The system according to claim 4, wherein the socket assembly comprises:
   a socket housing;
   a main power socket extending through a main power aperture of the socket housing; and
   a conductive element disposed along an interior bore of the main power socket.

6. The system according to claim 5, wherein the socket assembly further comprises one or more signal sockets and a pilot socket.

7. The system according to claim 6, wherein the at least one signal connection comprises the set of signal pins engaged with the one or more signal sockets, and wherein the pilot connection comprises the pilot pin engaged with the pilot socket.

8. The system according to claim 5, wherein the socket housing is in complementary mating abutment with the alignment device disposed within the interior of the handle.

9. The system according to claim 5, wherein the fluid connection and the main power connection comprise the conductive conduit engaged within the main power socket.

10. The system according to claim 5, wherein the handle includes a distal end proximate a torch head of the torch and the proximal end is adjacent the lead, wherein the proximal end of the handle includes a connector for releasably engaging the locking collar.

11. The system of claim 10, wherein the at least one signal connection, the pilot connection, the fluid connection, and the main power connection each are positioned within the interior of the handle, between the proximal end of the handle and the distal end of the handle.

12. A plasma arc torch comprising:
a lead having a first end connected to a power source;
a torch including a handle, the handle coupled to a second end of the lead; and
a quick disconnect assembly disposed within an interior of the handle proximate to a proximal end of the handle, the quick disconnect assembly comprising at least one signal connection, a pilot connection, a fluid connection, and a main power connection, wherein the at least one signal connection, the pilot connection, the fluid connection, and the main power connection terminate at locations within the interior of the handle that are spaced from the proximate end of the handle.

13. The plasma arc torch of claim 12, the quick disconnect assembly comprising a conductive conduit, a set of signal pins, and a pilot pin.

14. The plasma arc torch of claim 13, further comprising an alignment device disposed within the interior of the handle, wherein the conductive conduit, the set of signal pins, and the pilot pin extend through the alignment device.

15. The plasma arc torch of claim 14, the quick disconnect assembly comprising:
a socket assembly; and
a locking collar coupled to the socket assembly, the locking collar connected to the lead.

16. The plasma arc torch of claim 15, wherein the socket assembly comprises:
a socket housing;
a main power socket extending through a main power aperture of the socket housing; and
a conductive compliant element disposed along an interior bore of the main power socket.

17. The system according to claim 4, wherein the socket assembly is coupled to the second end of the lead, and the socket assembly is slidable received through the proximate end of the handle to be disposed within the interior of the handle.

18. The plasma arc torch of claim 15, wherein the socket assembly is coupled to the second end of the lead, and the socket assembly is slidable received through the proximate end of the handle to be disposed within the interior of the handle.

* * * * *